US006192029B1

(12) United States Patent
Averbuch et al.

(10) Patent No.: US 6,192,029 B1
(45) Date of Patent: Feb. 20, 2001

(54) METHOD AND APPARATUS FOR PERFORMING FLOW CONTROL IN A WIRELESS COMMUNICATIONS SYSTEM

(75) Inventors: Rod Averbuch, Buffalo Grove; Jeff Blanchette, Palatine; Richard Van Egeren, Arlington Heights; Todd A. Leigh, Schaumburg, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/015,690

(22) Filed: Jan. 29, 1998

(51) Int. Cl.[7] .......................... G01R 31/08; H04L 12/26; H04L 12/28; H04L 12/54
(52) U.S. Cl. .................... 370/229; 370/230; 370/234; 370/395; 370/413; 370/418
(58) Field of Search ...................... 370/229, 230, 370/234, 231, 232, 233, 412, 413, 414, 416, 418, 395, 389; 395/200.11, 325, 800

(56) References Cited

U.S. PATENT DOCUMENTS

| 5,644,576 | * | 7/1997 | Bauchot et al. | 370/437 |
| 5,644,717 | * | 7/1997 | Clark | 395/200.11 |
| 5,970,056 | * | 10/1999 | Brailean et al. | 370/296 |
| 5,978,359 | * | 11/1999 | Caldara et al. | 370/236 |
| 5,991,266 | * | 11/1999 | Zheng | 370/229 |
| 5,995,486 | * | 11/1999 | Iliadis | 370/229 |

* cited by examiner

Primary Examiner—Huy D. Vu
Assistant Examiner—M. Phan
(74) Attorney, Agent, or Firm—Scott M. Garrett

(57) ABSTRACT

A data communications system includes a server router (102), such as an access controller gateway, operably coupled to at least one client router (104), such as a base radio controller, by an asynchronous link, such as a LAN (106). The client router forwards data received from the server router and stored in the client router's outbound queue (110) synchronously to a device, such as a mobile station (202). The client router's outbound queue is maintained between a lower queue limit and an upper queue limit so as to both reduce the occurrence of data starvation and reduce the amount of data lost should the mobile station hand off to a new serving site. The server router calculates an optimum average send rate and transmits data in bursts at regular intervals, and adjusts the average send rate in response to changes in the outbound rate of the client router. The client router is state machine driven, and sends flow control messages only when entering a new state so as to reduce the amount of flow control messaging.

7 Claims, 11 Drawing Sheets

FIG. 5

| EVENT \ STATE | CLOSED | START | FILLING | NORMAL |
|---|---|---|---|---|
| START | | | | RESET TIMER<br>RECALCULATE RATE<br>RESET COUNT<br>SEND SFU BURST<br>→ START |
| DECREMENT | | RESTART TIMER<br>COUNT=RATE<br>→ NORMAL | START TIMER<br>COUNT=RATE<br>→ NORMAL | DEC. COUNT<br>AND RATE<br>→ NORMAL |
| INCREMENT | | DO NOTHING<br>→ START | DO NOTHING<br>→ FILLING | INC. COUNT,<br>RATE AND SEND<br>SFU<br>→ NORMAL |
| STOP | | RECALCULATE RATE<br>RECALCULATE COUNT<br>→ NORMAL | START TIMER<br>RECALCULATE RATE<br>RECALCULATE COUNT<br>→ NORMAL | RECALCULATE RATE<br>AND COUNT<br>→ NORMAL |
| PERIODIC TIMER | | DO NOTHING<br>→ FILLING | | START TIMER<br>SEND SFU BURST<br>→ NORMAL |
| SFU RECEIVED | DISCARD SFU<br>→ CLOSED | QUEUE SFU<br>SEND SFU<br>→ NORMAL<br>OR<br>→ START | QUEUE SFU<br>SEND ONE SFU<br>→ FILLING | QUEUE SFU<br>SEND SFU<br>→ NORMAL |
| PCH OPENS | CALCULATE<br>RATE AND<br>COUNT<br>START TIMER<br>→ START | | | |
| PCH INCREASES | | RESTART TIMER<br>RECALCULATE RATE<br>RECALCULATE COUNT<br>→ START | RECALCULATE RATE<br>→ FILLING | RESTART TIMER<br>RECALCULATE RATE<br>RECALCULATE COUNT<br>SEND SFU BURST<br>→ START |
| PCH DECREASES | | RESTART TIMER<br>RECALCULATE RATE<br>→ START | RECALCULATE RATE<br>→ FILLING | RESTART TIMER<br>RECALCULATE RATE<br>→ NORMAL |
| PCH CLOSES | | DISCARD SFUS<br>→ CLOSED | DISCARD SFUS<br>→ CLOSED | DISCARD SFUS<br>→ CLOSED |

| EVENT | STATE | | | | | |
|---|---|---|---|---|---|---|
| | INITIAL | DECREMENT | INCREMENT | STOP | START |
| PCH SETUP REQUEST | RECALCULATE QUEUE LIMITS → INITIAL | RECALCULATE QUEUE LIMITS → INITIAL | RECALCULATE QUEUE LIMITS → INITIAL | RECALCULATE QUEUE LIMITS → INITIAL | RECALCULATE QUEUE LIMITS → INITIAL |
| PCH SETUP REQUEST (CREATE PCH) | SET PCH TO UCH → START | ✕ | ✕ | ✕ | CALCULATE QUEUE LIMITS → START |
| PCH SETUP REQUEST (CLOSE PCH) | SET PCH TO UCH → START | SET PCH TO UCH → START | SET PCH TO UCH → START | SET PCH TO UCH → START | SET PCH TO UCH → START |
| QUEUE LENGTH = 0 (tx) | SEND START MSG → START | ✕ | SEND START MSG → START | ✕ | DO NOTHING |
| QUEUE LENGTH > Q_stop(rx) | SEND STOP MSG → STOP | SEND STOP MSG → STOP | ✕ | ✕ | ✕ |
| 0 < QUEUE LENGTH < Q_MIN (tx) | SEND INC MSG → INCREMENT | SEND INC MSG → INCREMENT | DO NOTHING | DO NOTHING | DO NOTHING |
| Q_MAX < QUEUE LENGTH < Q_STOP (rx) | SEND DEC MSG → DECREMENT | DO NOTHING | SEND DEC MSG → DECREMENT | DO NOTHING | DO NOTHING |
| Q_MIN < QUEUE LENGTH < Q_MAX (rx OR tx) | DO NOTHING | DO NOTHING | DO NOTHING | DO NOTHING → INITIAL | DO NOTHING → INITIAL |

METHOD AND APPARATUS FOR PERFORMING FLOW CONTROL IN A WIRELESS COMMUNICATIONS SYSTEM

TECHNICAL FIELD

This invention relates in general to data communications, and more particularly to methods and components used to control data transfer while minimizing the amount of flow control messaging between network entities, and even more particularly to systems providing packet data service in wireless communications systems.

BACKGROUND

Data communications systems are in common use throughout the world, and have come to be depended upon in fields such as banking and telecommunications. Indeed, data communications is essential in providing many present day services. In many data communications systems, data is transmitted asynchronously, meaning that the transmitting network entity and the receiving network entity are clocked at different rates, or are otherwise independently timed. By network entity it is meant a device that provides data, such as a server or mainframe computer, data routers, or terminals, for example. Additionally, it is often the case that the intended receiving network entity is one of many such network entities capable of receiving information over a common network. Furthermore, data may be routed through several network entities between the transmitting device and the intended receiving device. It is also commonplace that data routers receive data according to one protocol and forward the data according to a second protocol. In such a situation the router buffers information received while reformatting it to forward it to the next network entity.

In most instances the flow of data is controlled by flow characters or messages between the network entities. Typically a sending device will send a data packet and request acknowledgment from the receiving device that the data packet was received intact and in readable form. Some common forms of flow control include hardware local flow control such as RTS and CTS signals between a terminal and a modem, software local flow control such as XON/XOFF characters between a terminal and a modem, message flow control such as receiver ready/receiver not ready (RR/RNR) used in automatic repeat request (ARQ) protocols, to name but a few well practiced methods of performing flow control. While flow control is essential, it typically reduces the average data transfer rate since, instead of continuously transmitting data, the sending device sends a request and waits for acknowledgment. Performing flow control by such conventional means limits the performance of certain real time systems, particularly in telecommunications systems because of this send and wait strategy. Even if the wait time is minimized, flow control signals are transmitted through the same channel as data, thereby reducing the availability of the channel for data transfer. Furthermore this conventional approach to flow control is computing intensive, and impacts the performance of the computing equipment.

In fixed equipment systems, data routers and other network entities can buffer large amounts of data while performing other tasks or waiting for an open channel. In mobile systems, however, this is not always the case. This is because at any given moment, a mobile station such as a cellular telephone, that is receiving data, such as packet data, could hand-off to a new serving cell. The data buffered at the old serving cell would then be lost. Therefore, in mobile systems, it is preferred to keep the amount of buffered data to a minimum. At the same time, however, since wireless data service is typically more expensive than land line data service, it is important to minimize occurrences of data starvation. That is, times when the serving cell's data buffer is empty, and waiting for more data from the system. This suggests that a minimum amount of data should be buffered, but not so much that the data lost after a hand-off is significant.

Given conventional equipment, balancing the opposing goals of minimized buffer depth and avoiding data starvation is difficult at best in mobile data systems. This is in part due to conventional flow control methods which force a significant overhead on data communications channels. Furthermore, data services such as packet data are typically derived from asynchronous networks, while time divisioned telecommunications equipment, as in time division multiple access (TDMA) equipment, use signals in precisely timed frames. This means that data will come in bursts into the telecommunications system. Given that telecommunications signals are designed to transport real time signals (voice traffic), it is necessary to buffer incoming data bursts, thus building the buffer depth, then reducing the buffer over successive frames between data bursts. Adding the constraints of minimizing buffer depth while avoiding data starvation means that conventional flow control just encumbers data channels. Therefore, there is a need for a new method of performing flow control between network entities.

BRIEF DESCRIPTION OF THE DRAWINGS

FIG. 5 shows a state/event matrix for a server router in accordance with the invention;

FIG. 9 shows a state/event matrix for a client router in accordance with the invention;

DETAILED DESCRIPTION OF THE PREFERRED EMBODIMENT

Figure 1:
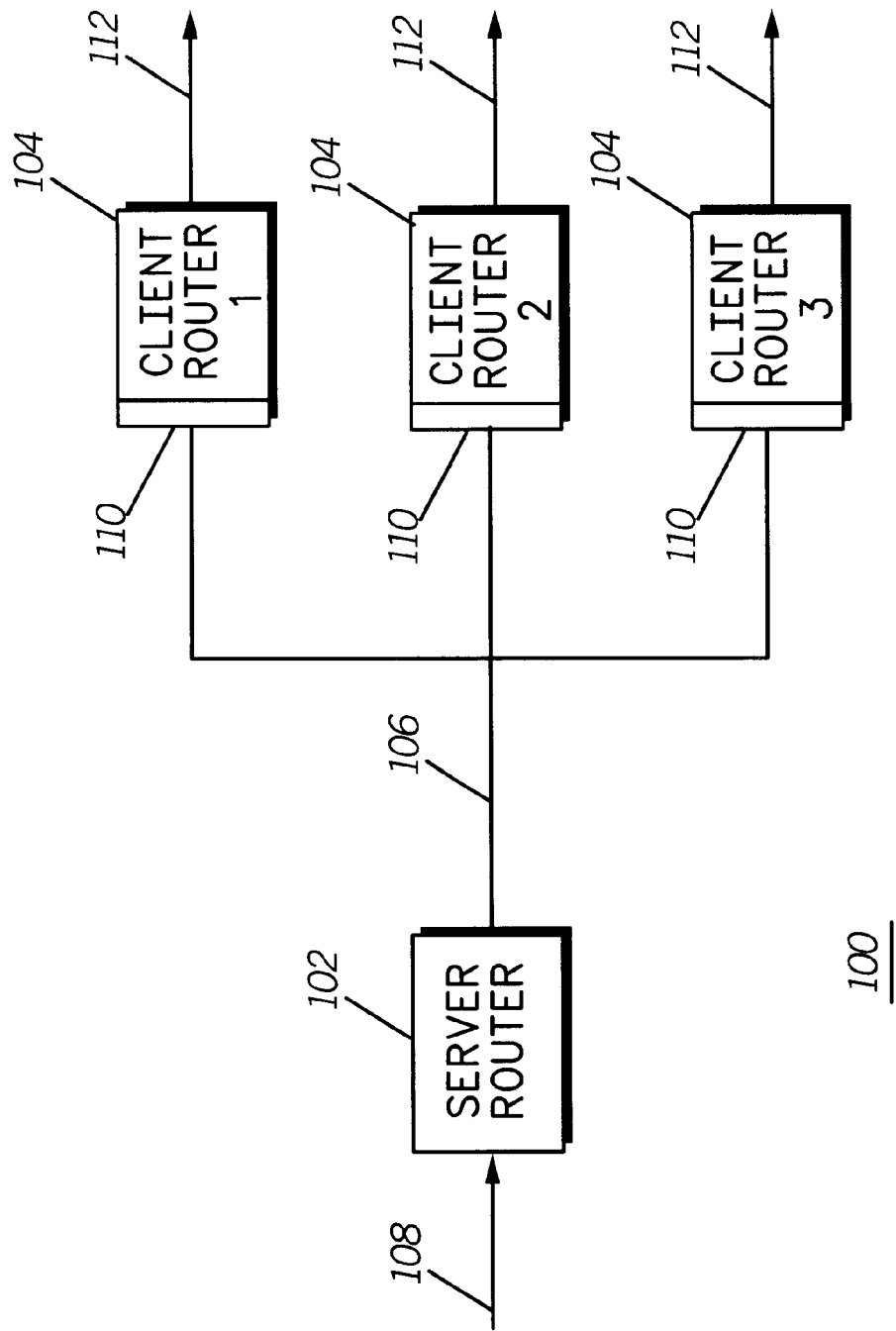
FIG. 1 shows a block diagram of a data communications system used in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention provides for a novel method of performing flow control between network entities that is particularly suited to mobile telecommunications systems offering packet data service. The method shifts the majority of the burden for performing flow control to the transmitting device. To do this requires that the transmitting device have some a priori information of the operating parameters of the receiving device. This allows the transmitting device to be able to determine and predict optimum transmission rates for the different operating conditions. Specifically, the transmitting device can predict the queue length of the receiving device, and forward data such that the queue depth of the receiving device is maintained at an optimum or near optimum level. In addition, the transmitting device is aware of the receiving devices outgoing data rate, and can therefore adjust its forwarding rate upon observing a change in the receiving devices outbound data rate to maintain an optimum queue depth at the receiving device. If, as can happen when the outbound rate changes frequently, the receiving device's outbound queue depth becomes too small or too large, some messaging is performed, but the receiving device does not repeat messages to avoid excessive use of computing resources.

Referring now to FIG. 1, there is shown a block diagram of a data communications system 100, and comprising a server router 102 and one or more client routers 104. The server router is operably coupled to each client router by an asynchronous network 106, and preferably a local area network (LAN) such as Ethernet. The server router 102 receives an input data stream 108 from a data source (not shown) such as a wide area packet network or a TCP/IP network, for example. The data stream may comprise data for each and any of the subnetworks served by each of the client routers. As such, it is a function of the server router to break out data for each of the different client routers and forward the data to each client router at an appropriate time in asynchronous data bursts. The client routers receive data over the network 106, and buffer it in a data queue 110. The client routers transmit or forward the data to other network entities over a synchronous channel 112, examples of which include T1, synchronous optical networks (SONET), and Global System for Mobile communication (GSM), to name but a few. In time divisioned systems, data is forwarded by a client router in a framed format. Each frame has a preselected number of "time slots", each time slot, or simply slot, having a preselected data length. Devices receiving data from the client routers know which slot contains data for it, and ignores data in other slots. Slot sequences are repeated, with a given slot in each successive frame containing new data. After each frame, the client router's queue is reduced by an amount equal to the data width of the number of slots it has filled in each outbound frame. Often the queue is several data frames deep. It is important to note that the asynchronous network 106 must have a data rate that is significantly higher that the outbound rate of the client router. For example a typical client router outbound rate may be on the order of 44 thousand bits per second, while an Ethernet LAN coupling the server router to the client router can have a data rate of 10 million bits per second.

In conventional flow control between the server router and the client routers, the server router could simply forward data as it is received. The client routers would be provided with large queues so that large amounts of data may be buffered, and subsequently forwarded over successive frames. However, in some systems this would be an impractical scheme. For example, as described hereinabove, a problem exists in mobile data communications systems. At a base site, where data is sent over the air to mobile stations, it is desirable to buffer a small amount of data so that, should the mobile station hand-off to another site, only a small amount of data will be lost. However, it is also necessary that some data be buffered so as to avoid data starvation, which decreases the efficiency of the system. In other words, if there is no data buffered, and the mobile station is waiting for more data, the equipment could be performing some other task rather than waiting for data to be forwarded by the server router. Data starvation such as this causes the mobile station to stay on line longer, thus increasing the cost for the service provider, and ultimately, the subscriber, and prevents the service providing equipment from performing other functions. It is possible that conventional flow control between the server router and the client router could satisfy the goal of maintaining a minimum amount of data buffered at a client router, but the amount of messaging may be prohibitive.

Generally, since the client routers forward data synchronously, they have a much more precise timing capability than the server router. As such, the server router cannot send slot filling units on an as-needed basis. Rather, it sends slot filling units in high speed bursts at intervals substantially longer than the outgoing frame interval of the client router. Typically the send interval is selected in the range of 2 to 30 times the frame rate. In providing data service to mobile subscribers, unlike voice service, more than one slot may be used in the outgoing frame to increase the effective data rate, provided those slots are not needed for other services. The slots chosen for packet data service make up what is referred to as a packet channel. The packet channel is dynamic, meaning that the number of slots used for packet data service can change during the course of providing service, depending on the amount of slots needed for other services. In performing the present method invention, the server router, in determining how many packet data slot filling units to forward, determines the number of slots presently allocated to the packet channel, and transmits a number of slot filling units at periodic send intervals so that the average number of slot filling units sent is equal to the outgoing rate of the particular client router, assuming the client router's queue has been filled to an optimum level. Thus, the selection of the send interval, the length of time between transmitting bursts of data from the server router to the client router, is an important consideration. These considerations will be discussed in more detail hereinbelow.

Figure 2:
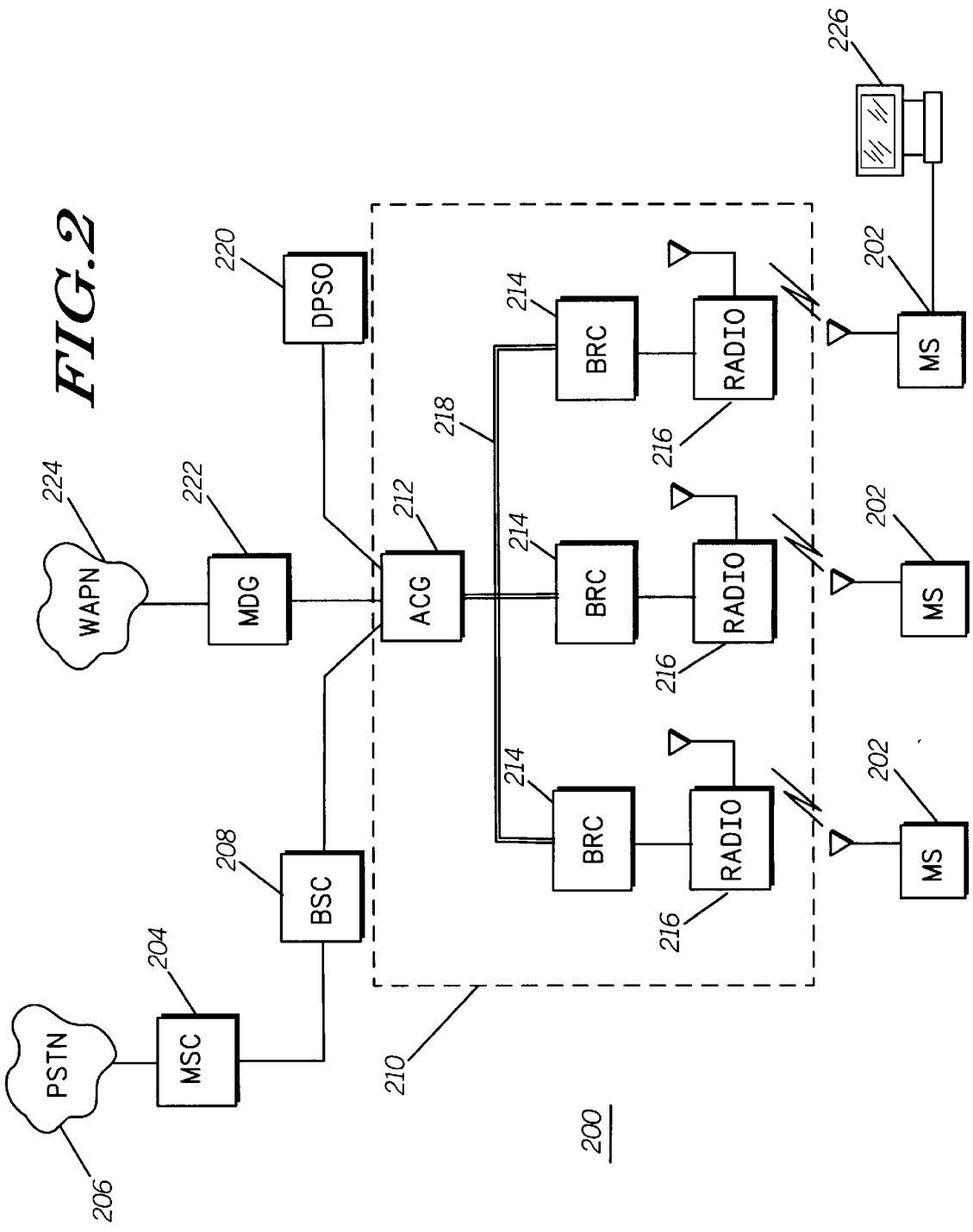
FIG. 2 shows a block diagram of a mobile communications system used in accordance with the invention.

Referring now to FIG. 2, there is shown therein a block diagram of a mobile communications system 200 operable in accordance with the present invention. The wireless communications system allows mobile stations 202, such as cellular radio-telephones, to communicate over the air and engage in telephone, dispatch radio, or packet data service, for example. In general, the system provides telephone interconnect service through a means for providing telephone interconnect service, such as a mobile switching center 204, which may be provided according to GSM. The mobile switching center can provide telephone interconnect calls to either another mobile subscriber, or to a public switched telephone network 206. Coupled to the mobile switching center is a plurality of base site controllers, such as base site controller 208, which may also be as provided by GSM. Briefly, the base site controller supervises a plurality of base sites, such as base site 210, and routes calls to the appropriate site when connecting a telephone call, such as from the PSTN, to a mobile station. The base site controller also supervises hand-offs of mobile stations between base sites. The base site 210 comprises control and radio equipment to establish a serving cell in the vicinity of the base site, as is well known in the art. The base site comprises an access controller gateway 212, one or more base radio controllers 214, and radio units 216 comprised of transmitters, receivers, power supplies, and antennas. The access controller gateway receives digital signals from the base site controller, among others, and forwards data to the appropriate base radio controller over a LAN 218. In the figure shown, the base site could be a sectored site, as is known in the art, having 3 sectors, one sector for each of the three base radio controllers shown. Each base radio controller receives its data, and formats it appropriately to be broadcast over wireless channels to the mobile stations 202.

The configuration of the base site is such that the access controller gateway acts as a server router to the base radio controllers, which, together with the a radio unit, act as client routers. The base radio controllers control the radio units with regard to timing, what type of modulation to use, and what data to send, among other parameters, as is known in the art. The access controller gateway may also receive data from a dispatch packet switching office (DPSO) 220, which is a means for providing dispatch radio service. The DPSO comprises equipment for providing dispatch control, dispatch packet switching, and dispatch voice packet duplication services, as is known in the art. The access controller gateway may also receive packet data from a data source, such as a mobile data gateway 222. A mobile data gateway provides packet data service to the system by connecting, through a router network, to a wide area packet network 224, such as the internet. This would allow a mobile station to connect to a computer 226, and act as a wireless modem, or the mobile station itself could act as the computer, and provide electronic mail service, for example.

Figure 3:
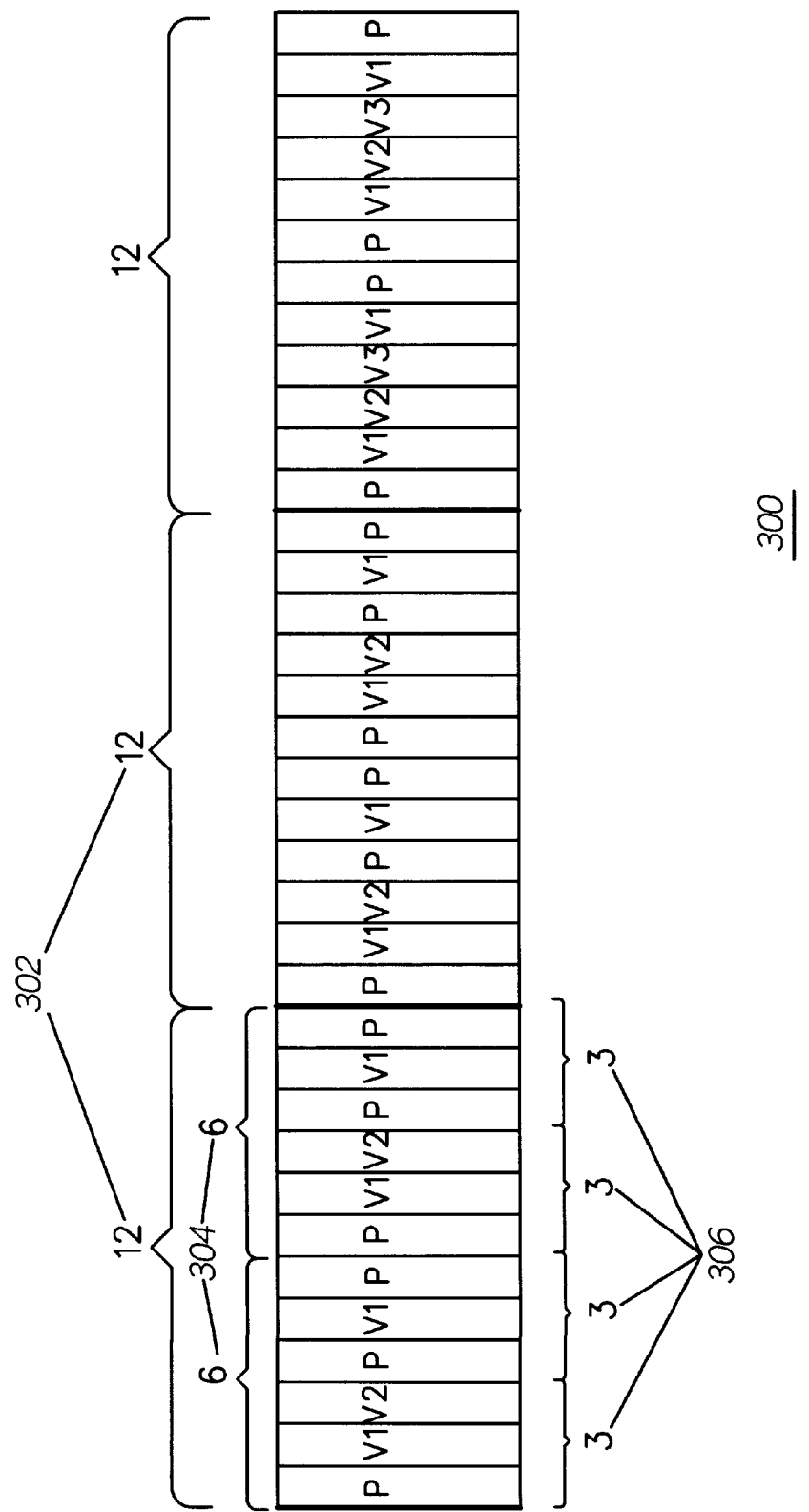
FIG. 3 shows a framed wireless signal used in accordance with the invention.

In the preferred embodiment, and as a skilled artisan would recognize, the system illustrated in FIG. 2 is that of an integrated services radio system. The wireless channels are typically both frequency and time divisioned, and data is sent over those channels using digital modulation schemes. As such, and as shown in FIG. 3, the wireless channels are defined as time slots, or simply slots, in a framed signal. Referring now to FIG. 3, there is shown a representation of a wireless channel 300 over time. Each box represents one time slot, which in the preferred embodiment is about 15 milliseconds long. In the preferred embodiment there are a variety of framing schemes; for example, packet data service may be framed every twelve slots 302, referred to as overlay-12. Packet data slots within the frame are represented with a "P". For voice traffic it is preferred that smaller frame sizes of either six slots 304 (overlay-6) or three slots 306 (overlay-3) be used.

When a mobile station registers with the system for telephone interconnect service, for example, it is assigned to one slot to receive voice data from the system, and another slot, and likely another frequency, to send voice data to the system to achieve full duplex communications. In order to accomplish this, the timing of the base radio equipment must be precise. Voice data is sent between the mobile subscriber and the system at a rate of one slot filling unit per frame. For example a first voice channel V1 is defined in the second slot of each overlay-3 frame, and a second voice channel V2 is defined in every 3rd slot of each overlay-6 frame. In providing packet data service, however, the real time constraints of voice communications do not apply; packet data may be sent slower or faster than voice data without any consequence other than the amount of time needed to transmit the data. As such, in the preferred embodiment, when the system opens a packet channel, it will use as many slots as optimally possible in each outgoing frame. For example, in FIG. 3, the packet channel consists of the 1st, 4th, 6th, 7th, 10th and 11th slots of each overlay-12 frame for the first two overlay-12 frames. However, since packet data is not real time data, the slots appropriated initially for the packet channel may be given up to provide voice service, as in the third overlay-12 frame, where a third voice channel V3 is defined, thus reducing the effective bandwidth of the packet channel by using a slot previously used for packet data.

Thus, the packet channel has a dynamic bandwidth as packet slots may be removed or added, depending on the needs of the system to provide real time traffic. In the preferred embodiment, the first slot of each packet data frame contains a listing of which slots of the frame carry packet data. This is referred to as dynamic channel allocation protocol (DCAP), and each packet data frame is referred to as a DCAP frame. Since the effective bandwidth of the packet channel can change on a frame by frame basis, flow control is important to both avoid data starvation and minimize data loss in the event of a handover.

Figure 4:
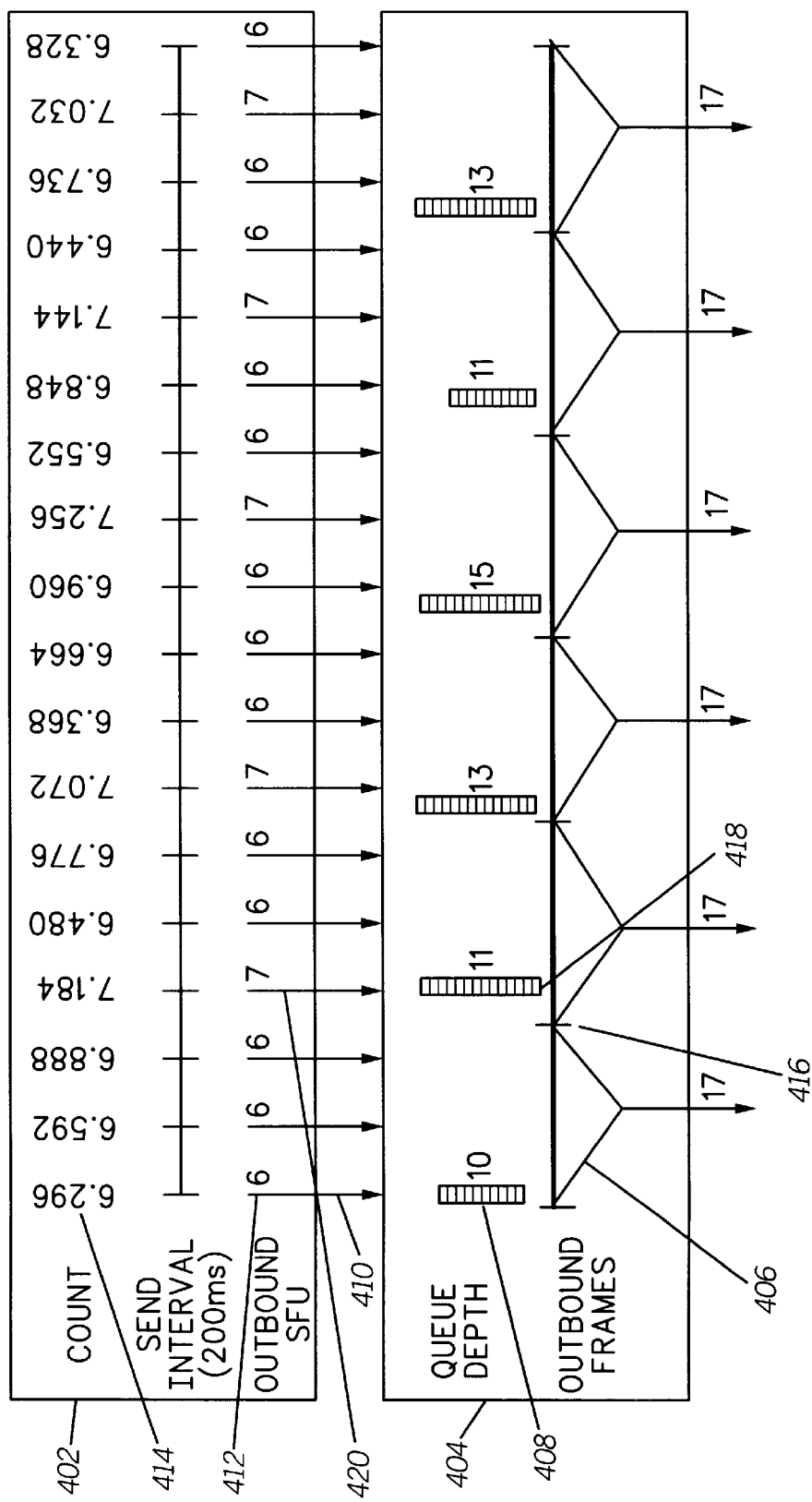
FIG. 4 shows a timing diagram for a data communications system in accordance with the invention.

Referring now to FIG. 4, there is shown a timing diagram 400 illustrating data flow between a server router, such as the access controller gateway 212 of FIG. 2, and a client router, such as a base radio controller 214 of FIG. 2, in accordance with the invention. The upper box 402 illustrates operation of the server router, while the bottom box 404 illustrates operation of the client router, both in accordance with the invention. As described herein, the client router forwards outbound data in frames, such as DCAP frames 406. For purposes of illustrating an aspect of the operation of the instant invention, assume that each outbound DCAP frame consists of 36 slots, half of which is used for packet data, the remaining half being devoted to other services such as telephone interconnect voice data. Thus, half of 36 leaves 18 slots for packet data, one of which is used for control purposes, such as informing the mobile stations which outbound slots contain packet data, leaving 17 slots per DCAP frame containing packet data in this example. These outbound frames are transmitted over the air by the base radio equipment to mobile stations. At the beginning of each DCAP frame, the queue depth 408 of the client router is shown. For the first frame of the example the queue depth is initially ten slot filling units, which then varies over subsequent frames as will be described hereinbelow.

The arrows 410 between the two boxes represent data sent over the LAN 218 of FIG. 2 from the server router to the client router. Data is sent in data units, and preferably formatted as slot filling units, in high speed data bursts, such as is possible over an Ethernet LAN, at a rate much greater than the outbound rate of the client router. The data bursts are sent at periodic send intervals of, for example, 200 milliseconds. In other words, every 200 milliseconds the server router transmits a number of slot filling units to the client router in a data burst over the LAN. In the server router box 402, the number of slot filling units sent 412 is shown with each outbound arrow 410. As described above, one aspect of the invention is that data is sent from the server router to the client router at the same average rate that the client router forwards the data to mobile stations. However, the server router does not have the same degree of timer granularity, and thus cannot send slot filling units on an as needed basis for each individual slot filling unit. Besides, even if the server router were equipped with such a precise timer, it typically has other functions to perform, such as servicing other client routers in the network.

For this example the packet channel remains constant at 17 slots per 36 slot DCAP frame. Since, in this example, each slot is 15 milliseconds in duration, the frame length is 540 milliseconds ([15 mS/slot]×36 slots). Therefore, a data rate variable RATE can be calculated as 17 SFU/540 mS=0.0315 SFU/mS, or about 6.296 slot filling units every 200 mS send interval. RATE is a floating point value having an integer portion and a fractional portion, and is used to calculate COUNT 414 maintained by the server router. COUNT is also a floating point variable, also having an integer portion and a fractional portion. As determined above, for this example, COUNT is initially set equal to RATE, resulting in 6.296 slot filling units to send. Obviously, however, a fractional slot filling unit cannot be sent, so the number of slot filling units to be sent is taken as the integer portion of the floating point value. Thus, for the first data burst, 6 slot filling units are sent. The number of slot filling units sent is subtracted from COUNT, leaving the remainder, 0.296, to be accumulated in COUNT. At the next send interval, RATE is added to COUNT, 6.296+0.296=6.592, and COUNT is equal to 6.592 slot filling units, meaning that 6 slot filling units will be sent in the next send interval. This process is repeated one more time before the first DCAP frame has been entirely transmitted. Thus, at the beginning of the second DCAP frame (416) 540 milliseconds later, 10 slot filling units were queued, 17 were forwarded, and 18 were received, leaving 11 slot filling units 418 in the client router packet data queue. At the 600 mS mark 420, however, shortly after the second DCAP frame begins (at the 540 mS mark), COUNT, because of accumulation of floating point remainders, has risen to 7.184 slot filling units, thus 7 slot filling units are transmitted in that data burst. The remaining DCAP frames and send intervals continue accordingly.

Thus, over a period of time, the amount of data sent from the server router will be the same as that forwarded by the client router over the packet channel. However, this example illustrates normal operation with a static packet channel size. In practicing the invention, many other considerations must be addressed. Chief among these is the volatility of the packet channel size, and other events, such as start-up and client router queue initialization, for example. There are many states and events that may occur at both the server router and at the client router. Although the server router administrates the packet channel, and thus has the required a priori information needed to do the calculations, feedback from the client router is still necessary occasionally to guarantee proper operation so that the client router queue limits are not exceeded during volatile packet channel conditions. Additionally, given a system with a high packet channel volatility, and therefore a volatile data rate, designing a server router that completely eliminates the need for flow control messages from the client router would result in a prohibitively expensive system.

To illustrate how different events are handled for the various states of operation, a state/event matrix for a server router such as an access controller gateway 212 of FIG. 2, is shown in FIG. 5. Referring now to FIG. 5, the states or operating modes are listed across the top row, while the various events that may occur are listed along the left side column. In the preferred embodiment, four states of operation are defined: CLOSED, START, FILLING, and NORMAL. The CLOSED state is defined as the state of operation when the packet channel is closed. This occurs when, for example, there are no free slots available in the outbound frames of the client router because they are all being used for other traffic, such as voice traffic. The START state is entered after the server router, here an access controller gateway, executes it's startup procedure to forward data to the client router. The START state captures the urgency of starting up and getting data to the client router for the client router to both forward and fill in the client router's outbound queue. This is because, at startup, the client router queue is empty. Consequently, RATE, as calculated in the example described in reference to FIG. 4, is exceeded to quickly fill the queue to an optimum level. The FILLING state is similar to the START state in that data, such as slot filling units, is sent without delay, and can be forwarded at a rate beyond the nominal average rate (RATE) used for normal operation. The FILLING state is typically entered when the server router is in START mode and the end of a send interval has been reached, but the client router queue has not been filled to the appropriate level. The NORMAL state includes operating as is shown in reference to FIG. 4. Data is received at the server router and forwarded at periodic intervals to achieve an average rate equal to the client router's outbound rate over a period of several send intervals.

For the CLOSED state, there are only two valid events. The first is SFU RECEIVED, which means that the server router has received a data unit, in this case a slot filling unit, from a source, such as a mobile data gateway 222 as shown in FIG. 2. However, since the packet channel is closed, the server router cannot forward the data to the client router, and therefore discards the slot filling unit. The server router remains in the CLOSED state, as indicated by the arrow pointing to the next state of CLOSED, a convention which is used throughout the diagram to indicate the next state of operation. The only remaining event of consequence is PCH OPENS, meaning that slots in the client router outbound frame have become available for data communication, and the server router transitions to the START state.

Upon entering the START state, the rate at which data is to be sent is calculated, and stored in the variable RATE, as described hereinabove, and is used to calculate COUNT. COUNT is used to keep track of how many slot filling units have been sent during the present send interval. Each time a slot filling unit is transmitted, COUNT is decremented by a value of 1. When COUNT falls below 1.0 during any given send interval, no more data will be transmitted in the present send interval. The first valid event listed on the matrix for the START state is DECREMENT. This means that a decrement message has been received from the client router, indicating that the client router's queue depth has reached a first upper queue limit. In the START and FILLING states, this means that the client router has queued an appropriate amount of data for the present packet channel width. The server router will then start or restart the periodic timer, and transition to the NORMAL state.

The next event listed is INCREMENT, but this results in no action from the server router, and the server router remains in the START state. Upon receiving a STOP message from the client router, indicating that the client router's queue has reached a second upper queue limit that is higher than the first upper queue limit. As illustrated in the next box, the server router ceases transmission, recalculates RATE and COUNT, and transitions to the NORMAL state. The STOP message is sent with a stop value STOP_COUNT, a number that tells the server router to reduce COUNT by a specified amount, which may even result in a negative number. If COUNT is still positive, the stop value will have been satisfied immediately. However, if COUNT becomes negative, a debt of sorts is created, and the server router must wait until COUNT becomes positive before the stop value is satisfied. Either way, the server router adjusts the average rate of transmission to satisfy the stop value. This helps the client router reduce its outbound queue to a nominal level without changing RATE. The PERIODIC TIMER event, next in the column, occurs when the send interval timer expires. When this occurs in the START state the server router transitions to the FILLING state.

The next event is SFU RECEIVED, which means that, as mentioned in reference to the CLOSED state, the server router has received data to be forwarded to the client router. In the START state, the server router queues the incoming data and sends slot filling units, or other data, to the client router. The server router remains in the START state while COUNT is greater than 1. When COUNT becomes less than 1.0, the server router transitions to NORMAL. However, if a PERIODIC TIMER event occurs while in the START state, while COUNT is greater than 1.0, the server router transitions to the FILLING state.

The next two events, PCH INCREASES, and PCH DECREASES, are both concerned with the packet channel changing in rate capacity. The client router does not inform the server router that this has happened, rather, the server router is aware of changes in the packet channel by virtue of directly administering the client router, or observing control signals or messages sent to the client router by an administering network entity. Upon the occurrence of either event, the periodic timer is restarted and RATE is recalculated. If the packet channel increases in rate capacity, that is, at least one additional slot from the outbound frame is added, the server router also recalculates COUNT, and immediately sends an additional slot filling unit, according to the preferred embodiment. Sending the additional slot filling unit effectively increases the outbound rate sooner than waiting for the next PERIODIC TIMER event. In the event of the packet channel closing, as is shown for PCH CLOSES, the server router transitions to the CLOSED state. In practice when this occurs, it will be a relatively long time before that packet channel opens so the server router discards any data for the particular client router not yet transmitted.

In the FILLING state, many of the events result in the server router taking the same, or similar action as in the START state. In the event of a DECREMENT message having been received in the FILLING state, the action taken by the server router is the same as that taken in the START state; in the event of an INCREMENT message being received from the client router, no action is taken and the state remains unchanged. In the event of receiving a STOP message from the client router while in the FILLING state, it is taken to mean that the client router has queued a sufficient amount of data, and normal operation may begin. Consequently, the server router recalculates RATE and COUNT, and starts the periodic timer running. The server router then transitions to the NORMAL state. The next event is SFU RECEIVED; when this occurs in the FILLING state, the slot filling unit is queued at the server router, and one slot filling unit is immediately forwarded. It is assumed that if this event occurs, neither a DECREMENT or STOP message has been received from the client router, therefore the client router's queue is not sufficiently filled, so the server router remains in the FILLING state, forwarding slot filling units from it's queue or as they are received. However, as in the START state, if a STOP message is received in the FILLING state, the COUNT variable is recalculated by subtracting the received STOP_COUNT value. If the packet channel capacity changes, as in PCH INCREASES or PCH DECREASES, the server router recalculates RATE, and remains in the FILLING state. Finally, the packet channel may close while in the FILLING state, in which case, as is always the case no matter the state, the server router discards any remaining slot filling units or other data waiting to be forwarded, and transitions to the CLOSED stated.

After the START or START and FILLING states, and assuming both the server router has data to transmit and a packet channel is available, the server router enters the NORMAL mode of operation, much as was described in reference to FIG. 4. However, in the example described in reference to FIG. 4, the only event that occurred was PERIODIC TIMER. As can be seen from the matrix in FIG. 5, numerous other events can also occur. For example, the NORMAL state is the only state at which a START event can occur. A START event occurs when, during NORMAL operation, the client router's outbound queue reaches a second lower queue limit, which is typically zero. To quickly fill up the queue to a nominal queue depth, the client router sends a START message to the server router, which then transitions to the START state. Accordingly, the periodic timer is restarted or reset, RATE and COUNT are recalculated, and slot filling units remaining in the server router's queue for that particular client router are transmitted to the client router right away until either COUNT reaches zero, or all the remaining slot filling units have been sent. In the event of receiving a DECREMENT message from the client router in the NORMAL state, the server router will, if any slot filling units remain to be transmitted during the present send interval, decrement both RATE and COUNT by a value of one, indicating one data unit or slot filling unit.

If the client router's queue depth drops to a first lower queue limit, which is greater than the second lower queue limit which triggers a START message, an INCREMENT message is sent to the server router. Upon receiving the INCREMENT message from the client router, the server router will, if there are slot filling units remaining to be transmitted in the present send interval, increment both the rate and COUNT. If data is available, then one slot filling unit is sent, and COUNT is decremented. For both INCREMENT and DECREMENT events, the server router remains in the NORMAL state. If, in the NORMAL state, a STOP message is received from the client router, and the COUNT variable is non-negative, RATE is recalculated, and COUNT is recalculated by subtracting the received STOP_COUNT value, as in the START and FILLING states. If COUNT is negative, indicating that a previous STOP message's stop count has not been completely satisfied, then COUNT is set equal to the negative value of STOP_COUNT. For example, if COUNT is −0.567 when the STOP message is received, and STOP_COUNT has a value of 4, COUNT is set equal to −4. However, if COUNT were +0.567, then COUNT would be 0.567−4=−3.433.

When the PERIODIC TIMER expires, it is restarted. While COUNT is greater than, or equal to 1.0, data (slot filling units) is transmitted to the client router, and COUNT is decremented as each one is sent over the LAN. Once COUNT falls below 1.0, it is recalculated by adding the value of RATE to the value of COUNT, and the server router remains in the NORMAL state. When an SFU RECEIVED event occurs in the NORMAL mode, the data is queued at the server router, one slot filling unit is sent, and COUNT is decremented accordingly. For an SFU RECEIVED event, the server router remains in the NORMAL state. When the PCH INCREASES event occurs, the server router performs the same action in the NORMAL state as was described for the same event in the START state, except that the server router then enters the START state. In the event of PCH DECREASES, the periodic time is reset or restarted, RATE and COUNT are recalculated. The server router then remains in the NORMAL state. When the PCH CLOSES occurs in the NORMAL state, the periodic timer is disabled, the remaining data queued at the server router is discarded, and the server router enters the CLOSED state next.

Figure 6:
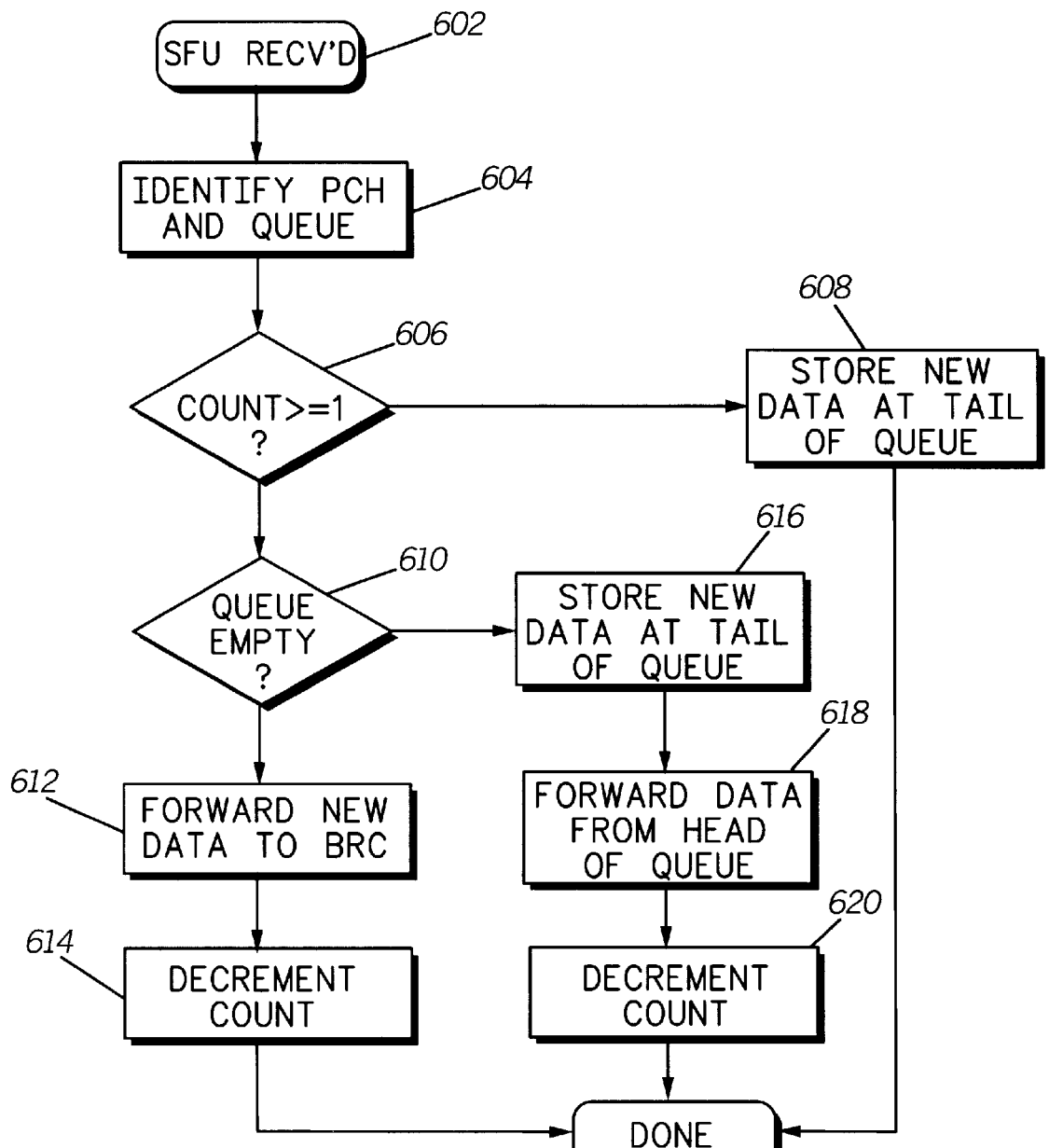
FIG. 6 shows a flow chart diagram for a data forwarding process in accordance with the invention.
Figure 7:
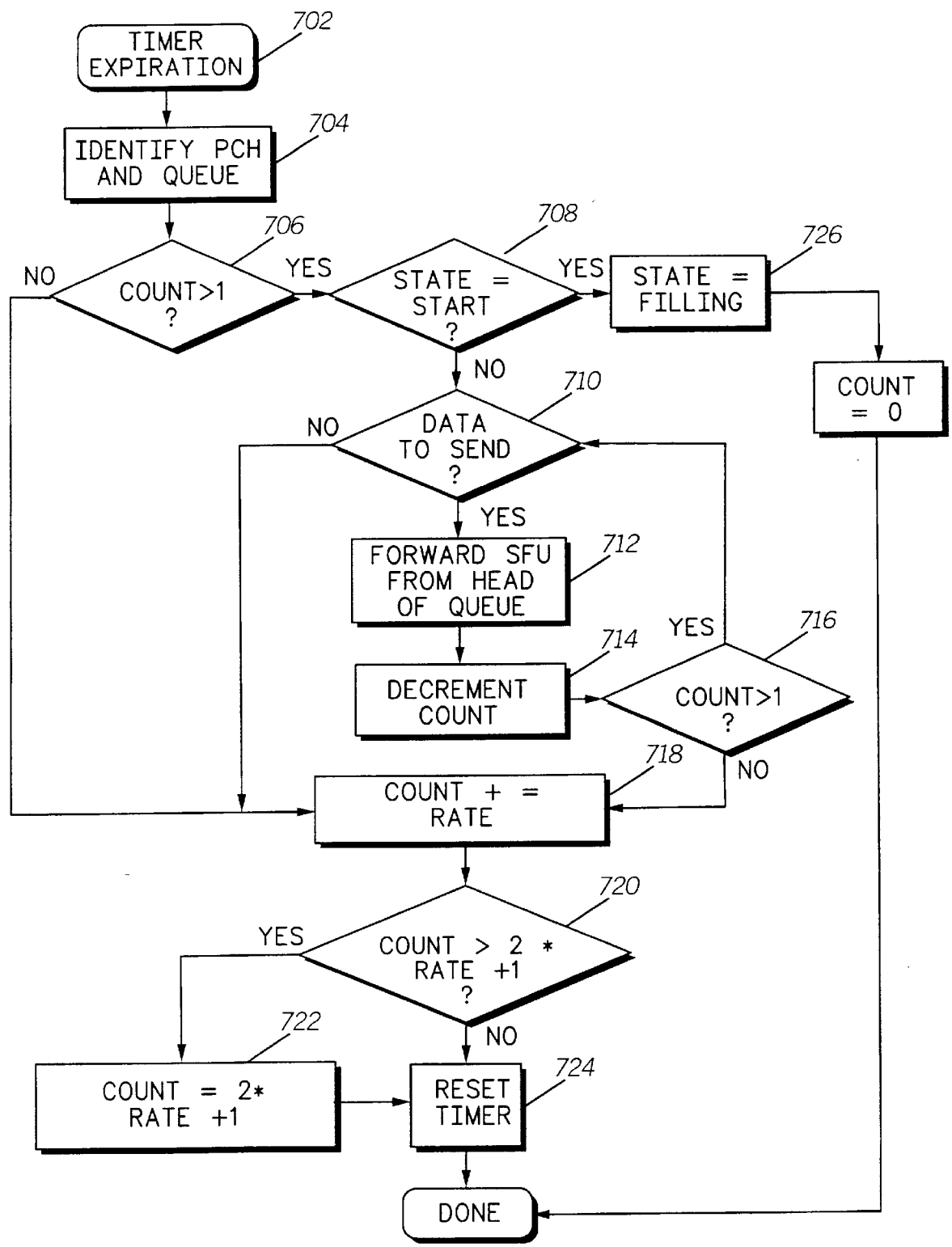
FIG. 7 shows a flow chart diagram for handling a periodic timer event in accordance with the invention.
Figure 8:
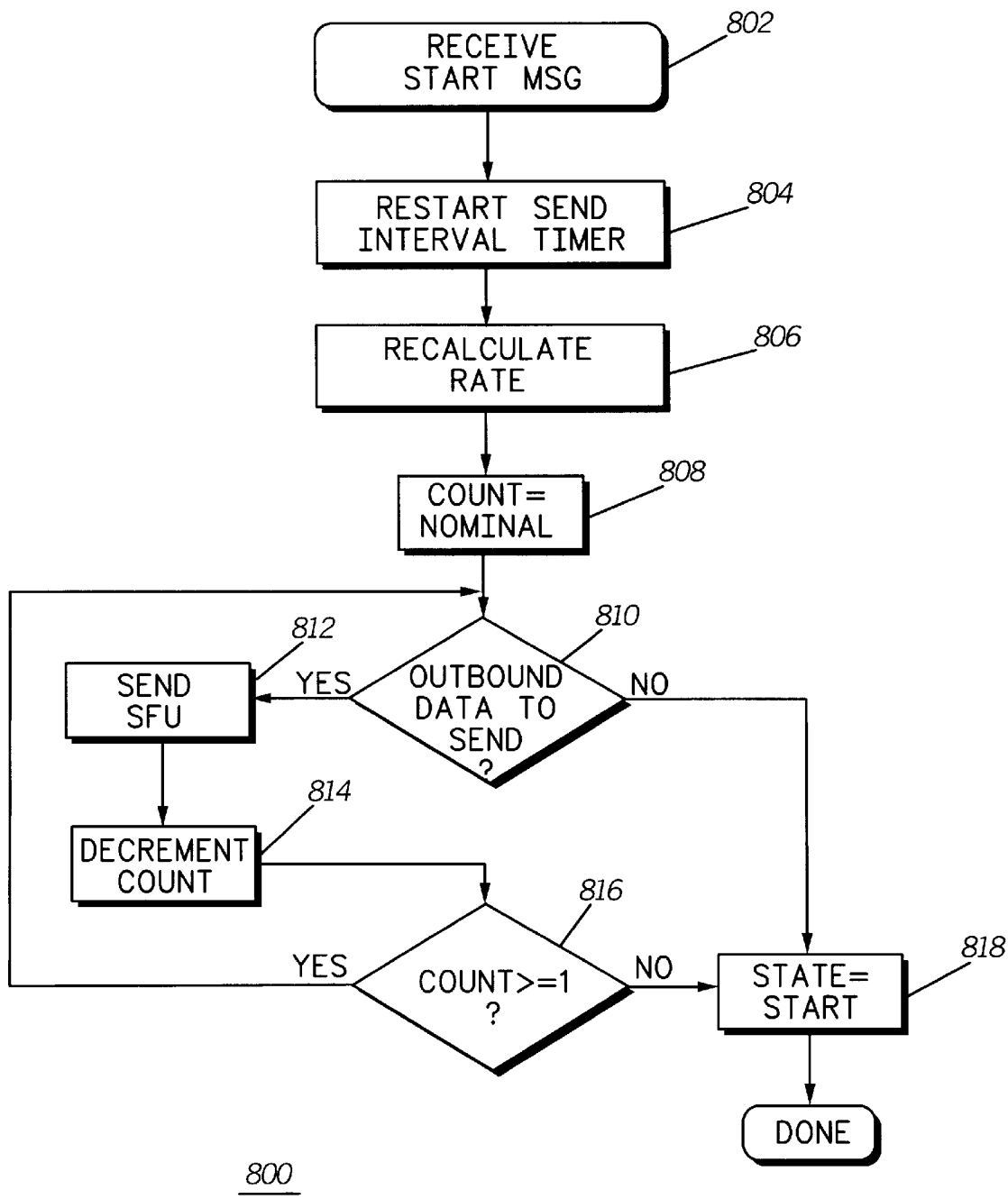
FIG. 8 shows a flow chart diagram for processing a start message in accordance with the invention.

To illustrate some of the scenarios that may commonly occur with the preferred embodiment, FIGS. 6–8 provide flow chart diagrams of some common occurrences. For example, FIG. 6 shows a flow chart diagram 600 of server router operation when a SFU RECEIVED event 602 occurs in the NORMAL state. The first step taken by the server router is to identify 604 which client router the data is meant for, since the data comes from, for example, a mobile data gateway, and can be for any one of several client routers the server router services. Accordingly, the server router must maintain a queue for each client router it services, as well as a RATE and COUNT variable for each. Accordingly, the server router checks COUNT in box 606 to determine if data can be sent to the client router in the current interval which is true if COUNT is greater than or equal to 1.0. If not, then, as in box 608, the newly received data is stored at the tail of the server router's outbound queue for the particular client router. If the server router may still send data to the particular client router during the present send interval, then the server router, as shown in box 610, must determine if the queue for that particular client router is empty. If it is, then, as shown in box 612, the new data is immediately forwarded, then the COUNT variable is decremented, as in box 614. If the outbound server router queue for the particular client router is not empty, then, as in box 616, the newly received data is stored at the tail of the queue, then, according to box 618, data from the head of the queue is forwarded, and finally, as in box 620, COUNT is decremented.

FIG. 7 shows a flow chart diagram 700 of how the server router handles a PERIODIC TIMER event, as shown on the server router state/event matrix of FIG. 5. The periodic timer is used to indicate the expiration of a send interval for a particular client router, so that, at the end of the send interval, the server router may transmit another data burst over the LAN to the corresponding client router. The choice of send interval duration depends on the specific application, but there are several guidelines that should be followed. First, the longer the send interval, the more data must be transmitted in each burst, thus increasing each burst duration. This can interfere with other LAN traffic in busy systems if the send interval is too long. Additionally, this adds to the client router's outbound queue volatility. If a long send interval is chosen, the client router's outbound queue may have a large amount of data immediately following the data burst from the server router, which goes against one of the goals stated hereinabove. However, a short send interval duration will require frequent LAN bursts, which may also interrupt LAN traffic. Furthermore, as was explained hereinabove, the server router typically does not have fine timing granularity, making it impossible to accurately resolve very short send intervals, without re-equipping the server router. For practical considerations, the send interval is preferred to be in the range of 2 to 30 times the duration of one outbound 15 millisecond slot in the client server's outbound frame. In the preferred embodiment, the send interval is 200 mS, or about 13.3 times the duration of one outbound slot.

Referring now to FIG. 7, the flow chart begins with the expiration of the periodic timer, as in box 702. At this point, one send interval has elapsed from the time the timer was last started or reset. The next step, as in box 704, is to identify which client router this particular timer corresponds with, as the server router may be servicing a plurality of client routers. Then, as in box 706, the server router evaluates COUNT for that particular server router to see if COUNT is greater than 1.0. If COUNT is greater than 1.0, meaning that data can be transmitted to the client router, then the server router proceeds to box 708 to determine if the present state is START. If the server router is not in the START state, the server router proceeds to the next step, as shown in box 710, and checks its outbound queue. From the state/event matrix of FIG. 5, one can see that there are only two valid states for the PERIODIC TIMER event, START and NORMAL. Therefore, if not in the START state, it is implied that the present state is NORMAL. Accordingly, the server router will proceed to transmit data to the client router, as illustrated by boxes 710, 712, 714, and 716. Essentially, these four boxes form a loop, and as long as COUNT is greater than 1, and the server router has data to send, data (slot filling units) is forwarded from the head of the queue (712). This means the data is transmitted over the LAN to the client router. Each pass through the loop, after the step of forwarding, COUNT is decremented (714), then evaluated (716).

Upon COUNT reaching a value less than 1.0 after successive decrements, as in box 718, COUNT is recalculated by adding RATE to the remaining value of COUNT. Since both variables are floating point variables, COUNT, under nominal operation, will likely be slightly larger than RATE. However, COUNT can become significantly larger than RATE if the loop is exited by the server router not having any data to send as shown in box 710. If this occurs, followed by a PERIODIC TIMER event, RATE will be added to COUNT, but because COUNT did not reach a value less than 1, COUNT can become as large as twice RATE in a matter of one or two send intervals. Since this would result in a large duration data burst when data is finally received at the server router, if COUNT is greater than twice RATE plus 1, as tested in box 720, the value of COUNT is capped to a little more than twice RATE. In the preferred embodiment, if COUNT is more than twice RATE plus one, then COUNT is limited to a value equal to twice RATE plus one, as shown in box 722. Either way, as in box 724, the periodic time is then reset, and the event is over. Backing up to box 706, if COUNT was found to have been less than 1.0, then the server router skips ahead to recalculate COUNT (718), and proceeds as described above. If, after determining that the present state is START, in box 708, the state is changed to FILLING, as in box 726, and COUNT is set to zero so that upon exiting FILLING, COUNT is set equal to RATE. The server router remains in FILLING until a DECREMENT or STOP message is received.

In FIG. 8, a valid model of processing a received START message is shown. Referring now to FIG. 8, there is shown a flow chart diagram 800 for processing a START message 802, performed by a server router, in accordance with the invention. Whenever the client router's outbound queue depth reaches zero, it will send a START message to the server router. Upon receiving the START message, as shown in box 804, the server router restarts the send interval timer, then, as shown in box 806, recalculates RATE to reflect the present packet channel bandwidth. The COUNT variable is reset to reflect the current packet channel bandwidth as well, as shown in box 808, and is set to a nominal value which is dependent on the packet channel bandwidth. Essentially, as the number of slots in the packet channel increases, so does the nominal value. This nominal value is a floating point value, and is preferably chosen to be the average of the lower queue limit and the first upper queue limit. Then, as long as there is data to send at the server router for the particular client router, and as long as COUNT is greater than or equal to 1.0, data is forwarded to the client router, as illustrated in boxes 810, 812, 814, and 816. If the server router either runs out of data to forward, or if COUNT becomes less then one after successive decrements, the server router exits the loop, sets the present state to START, as shown in box 818, and ends the procedure.

Thus, the present method invention for performing flow control between a server router, such as an access controller gateway, and a client router, such as a base radio controller, requires that the server router send data at regular intervals in bursts which, over time, are rate equivalent to the rate at which the client router forwards data to the network entities it serves, and that the client router maintain a small queue of data to avoid data starvation, yet not so much that a significant amount of data will be lost should the network entity that the client router services, such as a mobile station, disconnect from the client router, as can happen when a mobile station hands-off to another base site. To do this, the server router must calculate the rate at which it sends data based on the duration of the send interval. During each send interval a count is kept of how many units of data are sent, such as slot filling units. In the preferred embodiment two floating point variables maintained by computing equipment at the server router are used to do this. A first variable, RATE, is the calculated as the number of data units to be sent each send interval. A second variable, COUNT, is used to keep track of how many data units have been sent in the present send interval. During a send interval and while operating normally, COUNT is decreased by a value of 1.0 for each data unit sent. When COUNT reaches a value less than 1.0, no more data is sent from the server router to the particular client router until the beginning of the next send interval. Prior to the beginning of the next send interval, however, COUNT is recalculated by adding the value of RATE to the value of COUNT, which is less than 1.0, so COUNT will normally be slightly more than RATE. This simplified operation of the present method invention is fine in simple network systems with fixed channel capacities. However, in practice, it will often be the case that the outgoing data channel from the client router is dynamic, changing in rate capability.

A dynamic data or packet channel bandwidth, as described hereinabove, requires additional procedures to the basic method of performing flow control between a server router and its associated client routers. In a highly volatile packet channel, as can occur when the outbound resources of the client router are used for providing multiple services with differing priorities, changes can occur between send intervals. Thus, in the preferred embodiment some messaging from the client router is useful, but in keeping with the goal of reducing messaging between network entities, can be kept to a minimum. Accordingly, a state/event matrix for the client router is useful to define, and thus explain the preferred method of operating the client router.

Referring now to FIG. 9, there is shown a state/event matrix for a client router in accordance with the invention. As with FIG. 5 for the server router state/event matrix, states of operation are indicated across the top while events are listed down the left side. In deciding how much data should be queued by the client router the goals of the system should be restated; first, enough data should be queued to avoid a data starvation condition, and second, not too much data should be queued in the event the network entity receiving the data from the client router becomes disengaged. These goals dictate that the queue depth of the client router's outbound queue should be maintained between a first lower queue limit and a first upper queue limit, which are a matter of engineering choice. In the preferred embodiment, a second lower queue limit and second upper queue limit are also defined. The second lower queue limit is set equal to a very low value, and is typically zero. The second upper queue limit is a point at which transmission from the server router must stop, or the client router's queue will have too much data.

In the preferred embodiment the first lower queue limit is selected to be the larger of either 4 data units, such as slot filling units, or about 300 mS of data. To determine how many slot filling units are required for 300 mS of data, divide the product of the number of outbound slots used for data transmission in each outbound frame and 300 mS by the product of the slot duration and the total number of slots per outbound frame. In equation form, this looks like: lower queue limit=Q_MIN=MAX [(SLOTS_PER_DCAP*300) div(15*DCAP_FR_SIZE), 4]. As described hereinabove in reference to FIG. 3, the DCAP frame is the format used to frame data communications on the network. In the preferred embodiment, the DCAP frame consists of 24 slots, each having a duration of 15 mS. Therefore the only variable in the Q_MIN equation is how many slots are devoted to data transmission, SLOTS_PER_DCAP. The first upper queue limit is preferably selected to be Q_MAX=[(Q_MIN*5)div 2], or, roughly 2.5 times Q_MIN. It should be noted that these limits are integers, and div is integer division. Finally, the second upper queue limit, Q_STOP, is preferably selected as MAX(Q_MIN*3, Q_MAX+4), which says that it is the larger of either three times the lower queue limit, or the first upper queue limit plus 4. In general, Q_MAX is chosen to be high enough above Q_MIN to prevent the variance in the client router's queue depth from causing a large number of flow control messages. Q_STOP is chosen to be high enough above Q_MAX to allow the server router's response to a DECREMENT message to have time to take effect without forcing the client router to stop the data flow from the server router, but Q_STOP is chosen to be low enough to be the appropriate cap on the time-depth of the client router's queue.

Although briefly mentioned, it should be pointed out that Q_MIN, Q_MAX, AND Q_STOP are dynamic, and change in response to the bandwidth of client router's outbound transmission rate, i.e. the number of slots comprising the packet channel. When the packet channel bandwidth changes, that is, the number of outbound slots increases or decreases from one outbound frame to the next, the queue limits may change. The queue limits are preferably predetermined so that whatever the number of slots available, the client router can look up the corresponding queue limits for that number of slots, and judge the queue depth accordingly. At the same time, the server router adjusts RATE, and subsequently COUNT in response to changes in the number of slots. The server router does this by either being in control of the client router directly, as is the case when the server router is an access controller gateway as in FIG. 2, or by otherwise observing the change in the client router's outbound rate.

In the client router state/event matrix, there are five states, INITIAL DECREMENT, INCREMENT, STOP, and START. The reason a state machine is preferred is because the outbound frames from the client router can occur several times between server router send intervals, and it provides a way to prevent the client router from sending multiple messages back to the server router. Since the action from the server router won't take effect until the next send interval, sending multiple messages could drive the server router to send too much or too little data during the next burst, and so multiple messages should be avoided during a single send interval.

The first event is PCH SETUP REQUEST, which means that a message has been received from another network entity to change the outbound data or packet channel, and make it larger or smaller. In all states the client router takes the same action, the lower and first and second upper queue limits are recalculated and the client router then transitions to the INITIAL state. A second type of PCH SETUP REQUEST message can be received, as indicated by the second event listed, which occurs when no packet channel (PCH) exists, and is referred to as CREATE PCH. This can only occur in the START state of the client router, and the client router calculates the queue limits and remains in the START state. A third type of PCH SETUP REQUEST event involves receiving a message indicating that the PCH should be closed, CLOSE PCH. This can occur, for example, when the demand for voice traffic takes all available outbound slots, so that none are left for data communications. Accordingly, the PCH is set to an unassigned channel state (UCH), as required by many communications protocols, and the client router transitions to the START state.

The next five events have to do with the length of the client router's outbound queue. For example, in the event of QUEUE LENGTH=0, after sending a data unit, as indicated by the "tx" symbol, the queue is empty, and the client router has no data to send. This is a data starvation condition that is meant to be avoided. This event is only valid in the INYITAL, INCREMENT, and START states. In the INITIAL and INCREMENT states, a START message is sent to the server router, which then begins forwarding data at a faster than nominal rate, as was described hereinabove in reference to FIG. 5, and the client router transitions to the START state. If the client router is in the START state when the event occurs, it has already sent the START message, and so takes no further action.

If the queue length is greater than Q_STOP, the second upper queue limit, after receiving a data unit from the server router, as the next event indicates, then client router will send a STOP message, along with a stop value STOP_COUNT, and the client router transitions to the STOP state. . In responding to the STOP message, the server router will adjust the average rate it is transmitting data to the client router to satisfy the stop value. This occurs in both the INITIAL and DECREMENT states, and if the client router is already in the STOP state, no action is taken. This is not a valid event for any other state. STOP_COUNT, as described above, is a number indicating how many data units should be subtracted from the server router's COUNT variable for the particular client router. In the preferred embodiment STOP_COUNT is calculated as the queue length minus the average of Q_MIN, the lower queue limit, and Q_MAX, the first upper queue limit. This is to try and bring the queue depth back into the center of the range between the lower and first upper queue limits.

The next condition or event listed occurs when the client router's outbound queue length is more than a second lower queue limit, typically zero, but less than the first lower queue limit, Q_MIN, after transmitting a data unit, such as a slot filling unit. In the INITIAL and DECREMENT states when this occurs, an INCREMENT message is sent to the server router, and the client router transitions to the INCREMENT state, so as to avoid sending another INCREMENT while the queue depth stays below the first upper queue limit. In either the INCREMENT or START states when this occurs, no action is taken. If, as shown by the next event, the client router's outbound queue length exceeds the first upper queue limit Q_MAX, but is still below the second upper queue limit Q_STOP after receiving a data unit, in the INITIAL and DECREMENT states a DECREMENT message is sent to the server router, and the client router transitions to the DECREMENT state. In either the DECREMENT or STOP states when this occurs, no action is taken. Finally, if the client router's outbound queue length is between the lower queue limit Q_MIN and the first upper queue limit Q_MAX, no action is taken in either the INITIAL, DECREMENT, or INCREMENT states, and in either the STOP or START state the client router simply transitions to the INYIIAL state.

Thus, the client router calculates the limits for it's outbound queue and monitors the queue depth as data is both received from the server router and transmitted on to the next network entity, such as a mobile radio telephone. While the server router is operated such that it should send just enough data to maintain the client router's outbound queue between the lower and first upper queue limit, because of the volatile nature of the outbound data channel, the packet channel, and because of the differences in timing between the server router and the client router, the queue limits can be exceed, and so the client router is provided with the means to send an appropriate message such as INCREMENT, DECREMENT, or STOP messages.

Figure 10:
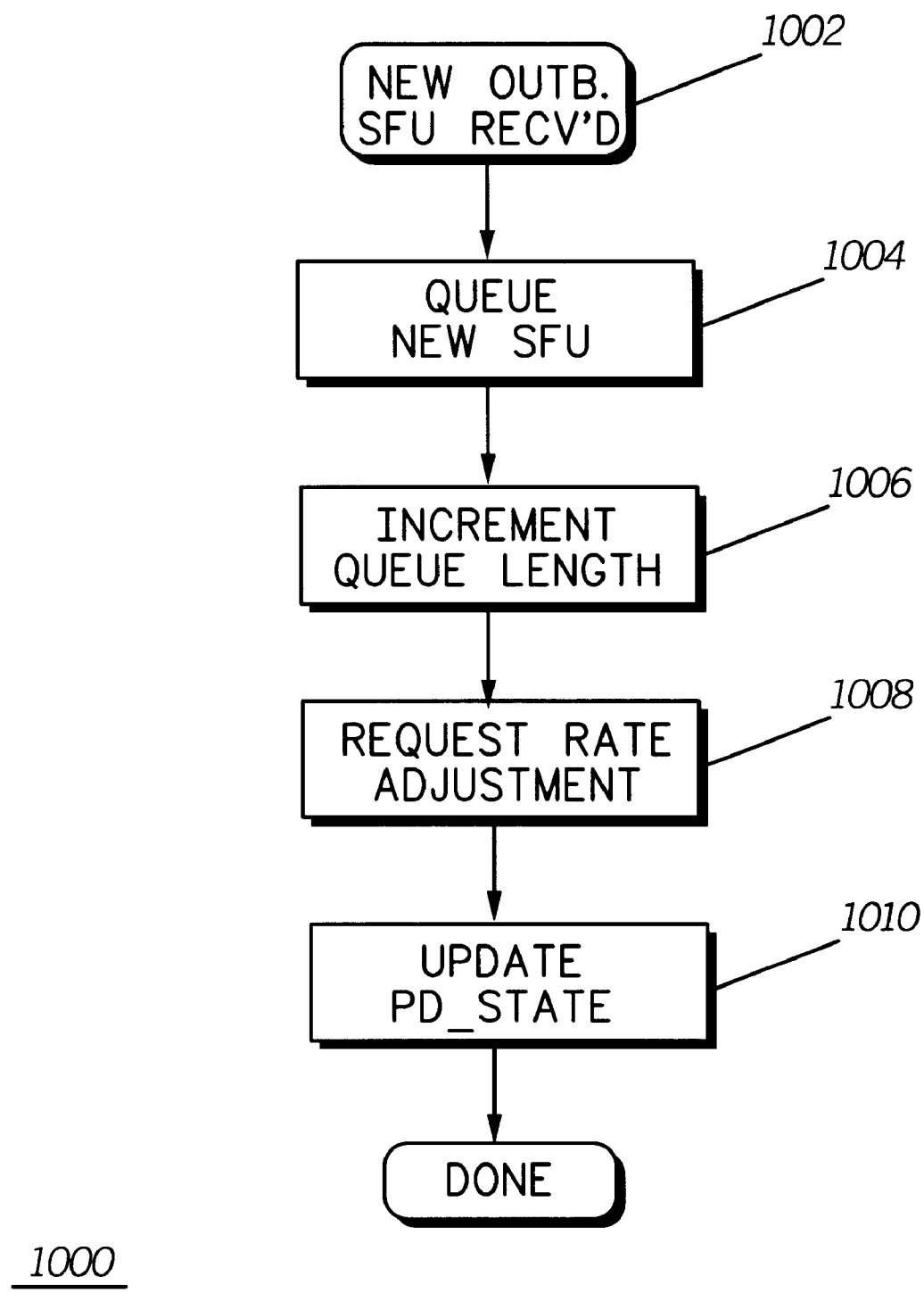
FIG. 10 shows a flow chart diagram for receiving data at a client router in accordance with the invention.

A basic flow of operation is illustrated in FIG. 10, which shows a flow chart diagram 1000 of a method for handling incoming data at a client router in accordance with the invention. First, as in box 1002, a data unit, such as a slot filling unit, is received from the server router at the client router. This data unit is to be forwarded on to, in the preferred embodiment, a mobile subscriber station. Accordingly, the data unit is placed at the tail of the client router's outbound queue, as shown in box 1004. By tail it is meant that all other data units presently in the queue will be sent prior to the data unit at the trail of the queue. In forwarding data units, a data unit is taken from the head of the queue, and each data unit moves down. This is a classic "first in, first out" (FIFO) type of queue. Upon queuing the new data the variable used to track the queue length or queue depth is incremented, as stated in box 1006. After adjusting the queue length variable to reflect the addition of the newly received data, the client server evaluates the queue length against the queue limits. If, according to the client router state/event matrix shown in FIG. 9, a rate adjustment is necessary because one of the queue limits was violated, then, as in box 1008, the client server will request a rate adjustment on the part of the server router. This will be either a STOP or DECREMENT message, as described hereinabove in reference to FIG. 9, since when receiving data, the outbound queue depth is increasing. If either the queue length is within the queue limits, or an appropriate message has already been sent, then no action is taken. Finally, as is stated in box 1010, when necessary, the client router's state is updated, as is meant by UPDATE PD_STATE. PD_STATE stands for packet data state. This is the variable used by the client router in determining what action to take in the event of the various occurrences/events listed in FIG. 9.

Figure 11:
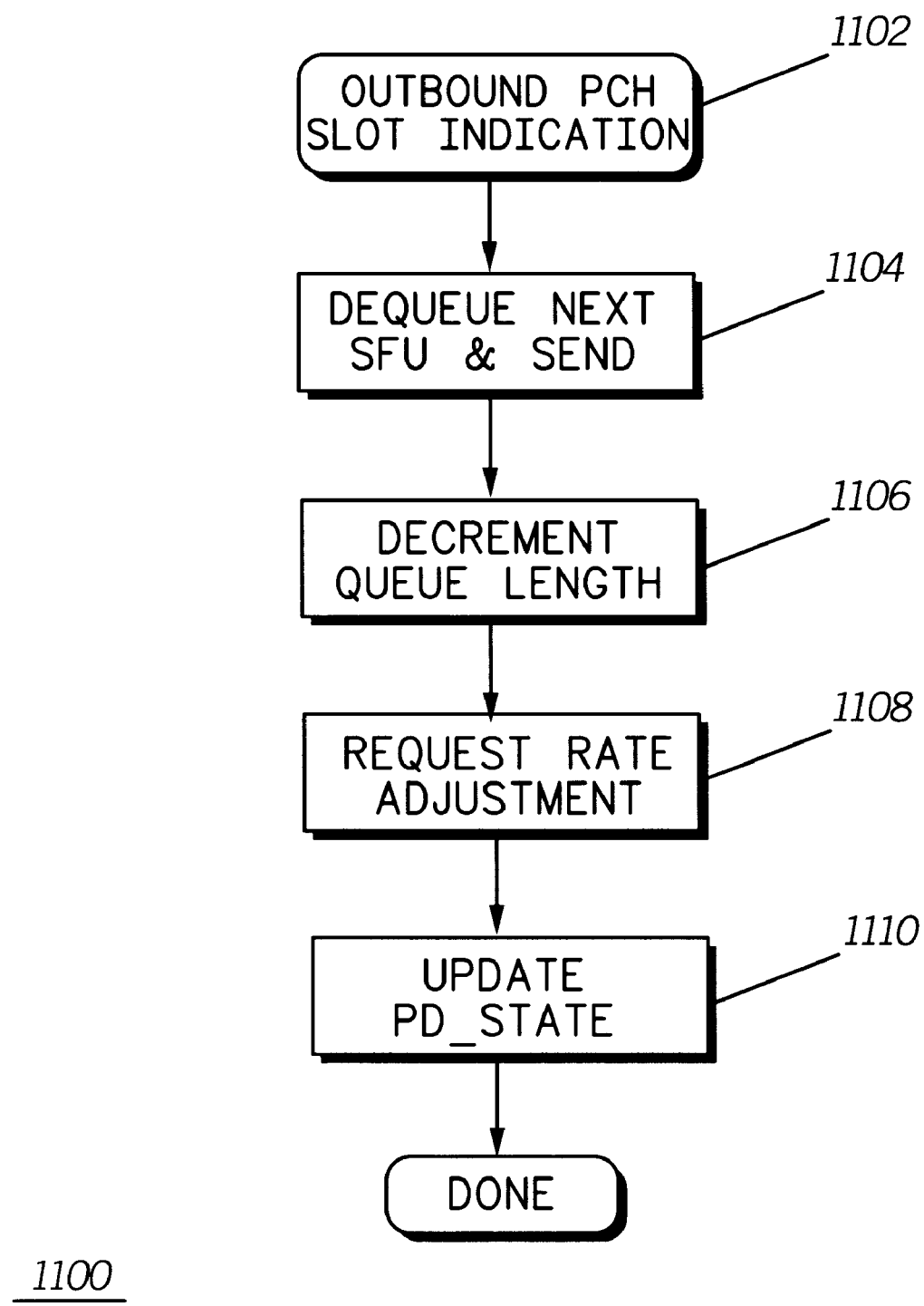
FIG. 11 shows a flow chart diagram for sending data from a client router in accordance with the invention.

When sending data, the client router has a similar process. Referring now to FIG. 11, there is shown a flow chart diagram 1100 for sending data from a client router in accordance with the invention. First, as in box 1102, a slot indication is generated and recognized by the client router, meaning that one of the slots comprising the packet channel is beginning. According, as in box 1104, a slot filling unit is dequeued from the outbound data queue and sent at the appropriate time during the slot occurrence. The queue length variable is decremented, as is shown in box 1106. If, as a result of dequeueing the slot filling unit, the queue length, as indicated by the queue length variable, falls below Q_MIN, an INCREMENT message is sent to the server router, and the client router will enter the INCREMENT state. If the queue length reaches zero, a START message will be sent to the server router, and the client router will enter the START state, as described in reference to FIG. 9. These alternatives are represented by box 1108, and occur only if the queue length drops below either of those two values. Finally, as indicated by box 1110, the PD_STATE variable indicating the present state is updated. For example, if, as described in reference to box 1108, the client router must enter INCREMENT or START, box 1110 is where the change of state occurs.

Thus, the invention solves the problem of conventional flow control messaging lowering the efficiency of data transmission in wireless communications systems. In practicing the invention, upon starting up, the server router begins by filling the outbound queue, then maintaining the queue depth of the outbound queue between a lower queue limit and a first upper queue limit, performed by transmitting data bursts comprising a number of data units, from the server router to the client router, asynchronously and at periodic send intervals. The number of data units sent per send interval defines an average rate which is substantially equal to the outbound rate of the client router. However, given the volatility of the bandwidth of the data channel between the client router and the intended network entity, the outbound rate may change significantly between send intervals, and the queue depth limits may be met or exceeded. Should the first upper queue limit be reached, the system will respond by sending a DECREMENT message when the queue depth reaches the first upper limit from the client router to the server router. The client router will then be placed in a DECREMENT state so as to avoid sending another DECREMENT message, so long as the queue depth stays below a higher second upper queue limit, and above the first lower queue limit. The server router will respond to the DECREMENT message by reducing the average rate by transmitting one less data unit per send interval. If the second upper queue limit is reached, the client router will respond by sending a STOP message to the server router, indicating a stop value, such as STOP_COUNT.

Should the queue depth drop to, or below, the first lower queue limit, and while it is above the second lower queue limit, the client router will respond by sending an INCREMENT message to the server router, and the server router will respond by increasing the average rate. Should the queue depth reach zero, the client router will respond by sending a START message, causing the server router to respond by performing the step of filling the outbound queue, as described above.

The process for maintaining the outbound queue between the desired queue limits includes calculating a RATE variable, which is a floating point value having an integer portion and a fractional portion. The value of RATE is equal to the outbound rate of the client router, but, is determined in terms of data units sent per send interval rather than in terms of client router outbound frames per unit of time. Another floating point variable COUNT used to keep track of how much data has been sent during each data burst, and is calculated by adding the value of the RATE variable to COUNT. Data is forwarded from the server router by transmitting to the client router an asynchronous data burst having a number of data units equal to the integer portion of the COUNT variable, upon the expiration of a periodic timer, such as a send interval timer, and decrementing the COUNT variable by 1 for every data unit so transmitted. To account for the fractional portions, the server router performs a process of accumulating the fractional portion of the COUNT variable in the COUNT variable. This results in the integer portion eventually reaching a value that is one unit greater than the integer portion of RATE. Over time, the average rate of the data bursts will be substantially equal to the outbound rate of the client router by repeating the steps of adding, transmitting, and accumulating.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing flow control in a wireless communications system while transmitting data from a server router to a client router, the client router transmitting data synchronously at an outbound rate and having an outbound queue having a queue depth, the server router receiving data units from a data source, the method comprising:

filling the client router's outbound queue;

calculating a RATE variable, having an integer portion and a fractional portion, having a value equal to the outbound rate of the client router;

adding the value of the RATE variable to a COUNT variable, the COUNT variable having an integer portion and a fractional portion, performed by the server router;

transmitting, to the client router from the server router, an asynchronous data burst having a number of data units equal to the integer portion of the COUNT variable upon the expiration of a send interval timer, and decrementing the COUNT variable by 1 for every data unit so transmitted;

accumulating the fractional portion of the COUNT variable in the COUNT variable; and repeating the steps of adding, transmitting, and accumulating.

2. A method of performing flow control in a wireless communications system as defined in claim 1, further comprising the step of repeating the steps of calculating a RATE variable and calculating a COUNT variable, performed by the server router, in response to a change in the outbound rate of the client router.

3. A method of performing flow control in a wireless communications system as defined in claim 1, wherein the step of filling comprises transmitting data units to the client router until receiving a DECREMENT or a STOP message from the client router.

4. A method of performing flow control in a wireless communications system as defined in claim 1, further comprising the steps of:

sending a DECREMENT message from the client router to the server router upon the queue depth of the outbound queue reaching a first upper queue limit;

decrementing the value of the RATE and the COUNT variable by 1 upon receiving the DECREMENT message at the server router; and placing the client router in a DECREMENT state so that no other DECREMENT messages are sent while the queue depth is below a second upper queue limit and above a first lower queue limit, the second upper queue limit being higher than the first upper queue limit.

5. A method for performing flow control in a wireless communications system as defined in claim 4, further comprising the steps of:

sending a STOP message including a STOP_COUNT value from the client router to the server router in response to the queue depth of the outbound queue reaching the second upper queue limit; and subtracting the STOP_COUNT value from the COUNT variable upon receiving the STOP message at the server router.

6. A method for performing flow control in a wireless communications system as defined in claim 1, further comprising the steps of:

sending an INCREMENT message from the client router to the server router upon the queue depth of the outbound queue falling below a first lower queue limit;

incrementing the value of the RATE and the COUNT variable by 1 upon receiving the INCREMENT message at the server router; and placing the client router in an INCREMENT state so that no other INCREMENT messages are sent while the queue depth is below a first upper queue limit and above a second lower queue limit.

7. A method for performing flow control in a wireless communications system as defined in claim 6, further comprising the steps of:

sending a START message from the client router to the server router upon the queue depth of the outbound queue falling to a second lower queue limit below the first lower queue limit; and performing the step of filling the outbound queue upon receiving the START message at the server router.

* * * * *